United States Patent
Takazawa et al.

US006784940B1

(10) Patent No.: US 6,784,940 B1
(45) Date of Patent: Aug. 31, 2004

(54) TRANSMITTING APPARATUS, AND METHOD FOR TRANSMITTING VIDEO SIGNALS OF HIGH SPEED IMAGE PICKUP APPARATUS (75) Inventors: Syuichi Takazawa, Kanagawa (JP); Yoshiro Nitta, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/468,527

(22) Filed: Dec. 21, 1999

(30) Foreign Application Priority Data

Dec. 22, 1998 (JP) .......................................... 10-365150

(51) Int. Cl.[7] .......................... H04N 7/12; H04N 11/02; H04N 11/04
(52) U.S. Cl. .................... 348/388.1; 386/68; 348/222.1
(58) Field of Search ............................. 386/68; 360/22; 348/388.1, 222.1, 355

(56) References Cited

U.S. PATENT DOCUMENTS

| | | | |
|---|---|---|---|
| 4,677,464 A | | 6/1987 | Yamaji et al. |
| 4,989,091 A | * | 1/1991 | Lucas .......................... 348/458 |
| 5,555,020 A | | 9/1996 | Ishihara et al. |
| 5,892,553 A | * | 4/1999 | Delmas ....................... 348/578 |

FOREIGN PATENT DOCUMENTS

FR        2 742 955        6/1997

* cited by examiner

Primary Examiner—Vu Le
Assistant Examiner—Gary L Solomon
(74) Attorney, Agent, or Firm—Frommer Lawrence & Haug LLP; William S. Frommer; Samuel S. Lee (57) ABSTRACT The present invention is to provide a high-speed image pickup apparatus, which can easily obtain the same image quality as that of the standard-speed image pickup by simply converting a high-speed video signal into a plurality of standard-speed video signals. Since the video camera system comprises a video camera for outputting a video signal by picking up an object at a high speed, a transmitting path for transmitting the video signal and a CCU for signal-processing the transmitted video signal, and divides the high-speed video signal into a plurality of standard-speed video signals directly or by providing a blank field as an additional period by the video camera, transmits the plurality of standard-speed video signals by the transmitting path, and arranges and outputs the plurality of standard-speed video signals at every unit period T by the CCU. By dividing a high-speed video signal into a plurality of channels of standard signals and signal-processing them, a high-speed photographing video camera system can be formed simply.

12 Claims, 7 Drawing Sheets

FIG. 3A ×3.0 Speed (Normal) Standard Video Signal×3

FIG. 3B ×2.0 Speed Standard Video Signal×3

FIG. 4A
×3.0 Speed
Standard Video Signal×3

FIG. 4B
×2.0 Speed
Standard Video Signal×3

TRANSMITTING APPARATUS, AND METHOD FOR TRANSMITTING VIDEO SIGNALS OF HIGH SPEED IMAGE PICKUP APPARATUS

BACKGROUND OF THE INVENTION

1. Field of the Invention

The present invention relates to a video signal transmitting apparatus for transmitting a video signal picked up, for example, by a video camera to a signal processing system at a later stage.

2. Background of the Invention

In a case where a high-speed photographing is carried out by a video camera system which is constituted by a video camera and a camera control unit (hereafter, referred to as "CCU") like a video camera system for broadcast business use, it is possible to obtain a signal having a frequency band which is two times as fast as a conventional standard video signal.

Conventionally, this high-speed video signal has been transmitted as it is directly from the camera to the CCU. In a case of the high-speed video signal being digitally transmitted, when the same image quality as an image of a standard-speed is sought after in comparison with a standard signal transmission, a sampling frequency of a twofold of the standard speed has been needed.

Problems this Invention is to Solve

With the above-mentioned conventional video camera system, since a sampling frequency of a twofold speed is necessary to seek after the same picture quality in a high-speed video signal as an image of a standard-speed, a drive frequency of an LSI (large scale integrated circuit) and the like to deal with a signal becomes very high and at the same time, a higher timing performance is required at respective electric circuits, which have technically been difficult, thereby incurring a inconvenience. Also, although some high-speed photographing speed can be coped with, in a case of coping with another speed, since a video signal obtained as it is leads to changes of a band when it comes to a wide range of speeds, there is an inconvenience such that it is difficult to simply cope with variable speeds.

The present invention is implemented in view of such aspects and its objective is to provide a video signal transmitting apparatus, a video signal transmitting method, a video signal image pickup apparatus, and a video signal processing apparatus which are capable of obtaining the same picture quality as an image of a standard-speed from a high-speed video signals by simply converting a high-speed video signal into a plurality of video signals of a standard-speed.

SUMMARY OF THE INVENTION

According to the present invention, a signal transmitting apparatus for transmitting high-speed video signals, said video signals being obtained by picking up an image of an object by an image pickup means at a speed which is predetermined times faster than that of the standard video signal comprising:

a converting means for converting the output of said image pickup means into digital signals, a signal dividing means for forming digital video signals having the speed of said standard video signal from the high-speed video signals outputted from said converting means at every unit, dividing said digital video signals into a plurality of channels and outputting said digital video signals, a first signal processing means for performing a predetermined camera signal process to each of the output signals of said signal dividing means, converting said output of said signal dividing means into digital signals of said plurality of channels in the predetermined transmission format and outputting said digital signals, a transmission path for transmitting the output of said first signal processing means, a second signal processing means for converting said digital signals of said predetermined transmission format which have been transmitted through said transmission path into said original digital video signals having a plurality of channels, an output means for converting the output of said second signal processing means into digital signals in the predetermined format and for outputting said digital signals.

The signal transmitting apparatus according to the present invention, said signal transmitting apparatus further comprising a memory means, when high-speed video digital signals having a multiple number smaller than the number of channels of said signal dividing means are inputted from said converting means, said signal dividing means generating an indication signal which indicates the period in which no digital video signal having the speed of said standard video signal exists on divided channel, and outputting said indication signal to said first signal processing means, said first signal processing means outputting the digital signals of a predetermined transmission format, the period in which no digital video signal having the speed of said standard video signal exists, and said indication signal, said memory means writing each of said digital video signals of said plurality of channels outputted from said second signal processing means, reading said digital video signals of said plurality of channels outputted from said transmission path and arranged at every unit time with additional data period which is added in responsive to said indication signal and outputting said digital signals of said plurality of channels with each additional data period which have read by said memory means to said output means, said output means selecting and outputting said digital video signals of said plurality of channels with additional data period which have read by said memory means.

According to the present invention, a signal transmitting method for transmitting high-speed video signals which are obtained by photographing an object by an image pickup means at a speed which is predetermined times faster than that of standard video signal comprising:

a converting step of converting the output of said image pickup means into digital signals, a signal dividing step of forming the digital signals having the speed of said standard video signal from said high speed photographing video signals unit by unit which have been formed in said converting step, dividing said digital video signals into a plurality of channels and outputting said divided digital video signals, a first signal processing step of performing a predetermined camera signal process to each of the output signals of said signal dividing step, converting said digital signals into digital signals of said plurality of channels in a predetermined transmission format and outputting said signals, a transmitting step of transmitting the output of said first signal processing step, a second signal processing step of converting the digital signals which have been converted into a predetermined format and have been transmitted by said transmitting step into the original digital video signals of said plurality of channels, an output step of converting the output of said second signal processing step into digital signals in a predetermined format and outputting said digital video signals.

The signal transmitting method according to the present invention, said signal transmitting method further comprising a memory step, when high-speed video digital signals having a multiple number smaller than that of said channels of said signal dividing means are inputted from said converting means, said signal dividing step generating an indication signal which indicates the period in which no digital video signal having the speed of said standard video signal exists on divided channel, and outputting said indication signal to said first signal processing step, said first signal processing step outputting said digital signals in a predetermined transmission format, no digital video signal said no digital video signal having said standard video signal exists, and said indication signal, said memory step writing each of said digital video signals of said plurality of channels outputted from said second signal processing step, reading said digital video signals of said plurality of channels outputted from said transmitting step and arranged at every unit time with additional data period which is added in responsive to said indication signal and outputting said digital video signals of said plurality of channels with each additional data period which have read by said memory step to said output step, said output step selecting and outputting said digital signals of said plurality of channels with additional data period which have read by said memory step.

According to the present invention, a high speed image pickup apparatus which is applied to pick up an image of an object at a high speed which is faster than that of standard video signal and to output high-speed video signals obtained thereby comprising:

an image pickup means for picking up an image of an object at a speed which is predetermined times faster than that of the standard video signal, a converting means for converting the output of said image pickup means into digital signals, a signal dividing means for forming digital video signals having the speed of said standard video signal from the output of said converting means at every image unit, dividing said digital video signals into a plurality of channels and outputting said divided digital video signals, a signal processing means for performing a predetermined camera signal process to each of the output signals of said signal dividing means, converting said digital signals into digital signals of said plurality of channels in a predetermined format and outputting said digital signals as high speed photographing video signals.

The high speed image pickup apparatus according to the present invention, when the multiple number of said photographing speed of said image pickup means is smaller than the number of channels of said signal dividing means, said signal dividing means generating an indication signal which indicates the period in which no digital video signal having the speed of said standard video signal exists on divided channel, and outputting said indication signal to said signal processing means, said signal processing means outputting said digital video signals in a predetermined transmission format, no digital video signal said no digital video signal having said standard video signal exists and said indication signal.

According to the present invention, a high speed image pickup method for picking up an image of an object at a high speed which is faster than that of standard video signal and for outputting the obtained high speed photographing video signals comprising:

an image pickup step for picking up an image of an object at a speed which is predetermined times faster than the speed of the standard video signal and for forming the video signals, a converting step of converting the output of said image pickup step into digital video signals, a signal dividing step of forming the digital video signals having the speed of standard video signal from the output of said converting step at every video unit, dividing said digital video signals into a plurality of channels and outputting said divided digital signals, a signal processing step of performing a predetermined camera signal process to each of the output signals of said signal dividing step, converting said digital signals of said plurality of channels into a predetermined transmission format and outputting said digital video signals as high speed photographing video signals.

The high speed image pickup method according to the present invention, when the multiple number of said image pickup speed of said image pickup step is smaller than the number of said channels of said signal dividing step, said signal dividing step generating an indication signal which indicates the period in which no digital video signal having the speed of said standard video signal exists on divided channel, and outputting said indication signal to said signal processing step, said signal processing step outputting digital signals in said predetermined transmission format, no digital video signal said no digital video signal having the speed of said standard video signal exists, and said indication signal.

According to the present invention, an image pickup apparatus for picking up an image of an object at a speed which is selected from the speed of standard video signal and speeds faster than that of the standard video signal and for outputting the standard video signals or high speed photographing video signals which have been obtained thereby comprising:

an image pickup means for picking up an image of said object at a speed which is selected from the speed of the standard video signal or the speeds a predetermined times faster than that of the standard video signal, a converting means for converting the output of said image pickup means into digital signals, a signal dividing means for outputting the output of said converting means when the speed at which said image pickup means picks up an image of said object is the same as that of standard video signal and for forming digital video signals having the speed of said standard video signal from the output of said converting means at every video unit, dividing said digital video signals into a plurality of channels and outputting said digital video signals when the speed at which said image pickup means picks up an image of said object is predetermined times faster than that of the standard video signal, a plurality of signal processing circuits, the number of which is at least the same as that of said channels divided by said signal dividing means and each having the same predetermined camera signal process function, when the speed at which said image pickup means picks up an image of said object is the same as that of standard video signal, the output of said signal dividing means being processed by one channel of said signal processing circuits to convert said digital video signals into digital signals in the predetermined format, the operation of the other channels being stopped, when the speed at which said image pickup means picks up an image of said object is predetermined times faster than that of standard video signal, the output of said signal dividing means being processed by all the channels of said signal processing circuits to convert said digital signals into digital signals of said plurality of channels in a predetermined format to be outputted as high speed photographing video signals.

DESCRIPTION OF THE PREFERRED EMBODIMENTS

Hereafter, embodiments will be explained. First of all, an arrangement of a camera system which uses a video signal transmitting apparatus of an embodiment will be explained with reference to FIG. 1.

Figure 1:
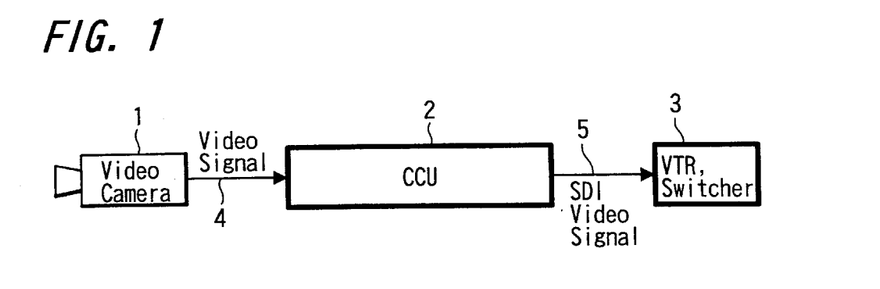
FIG. 1 is a block diagram showing a camera system of an embodiment.

In FIG. 1, the camera system comprises a video camera 1 for producing a video signal and a audio signal at a high speed (faster than the standard speed), a CCU (camera control unit) 3 for receiving the video signal supplied by the video camera 1 and outputting it to various kinds of video equipments as a video source, an optical fiber 4 for connecting the video camera 1 with the CCU 2, a VIR, switcher 3 for recording or sending out the video signal outputted from the CCU 2 and a cable 5 for connecting the CCU 2 with the VTR, switcher 3. The CCU 2 outputs a video signal of an SDI (serial digital interface) system based on SMPTE259M.

The optical fiber 4 uses a composite optical fiber cable which combines, for example, 2 strings of optical fibers for transmitting and receiving and a metal cable for a power source line and control as well.

The camera system constituted in such a fashion operates in the following. For example, in a case when the video camera 1 is disposed in a studio and the CCU 2 and the VIR, and the switcher 3 are disposed in a sub-adjusting room, the optical fiber 4 disposed between the studio and the sub-adjusting room connects the video camera 1 with the CCU 2. The CCU 2 in the sub-adjusting room supplies various kinds of control signals to the video camera 1 through the optical fiber 4.

As a result, when a program is photographed by the video camera 1 in the studio, a video signal and an audio signal therefrom are supplied to the CCU 2 in the sub-adjusting room through the optical fiber 4. The video signal and the audio signal are outputted from the CCU 2 to be signal-processed at the VTR, switcher 3 and the like at a later stage so that the 12 video signal and the audio signal are recorded, edited and sent out.

Meanwhile, an optical transmission format by the optical fiber 4 is defined by ARIB STANDARD BTA-SOO4B, SOO5B, SOO6B standards.

Figure 2:
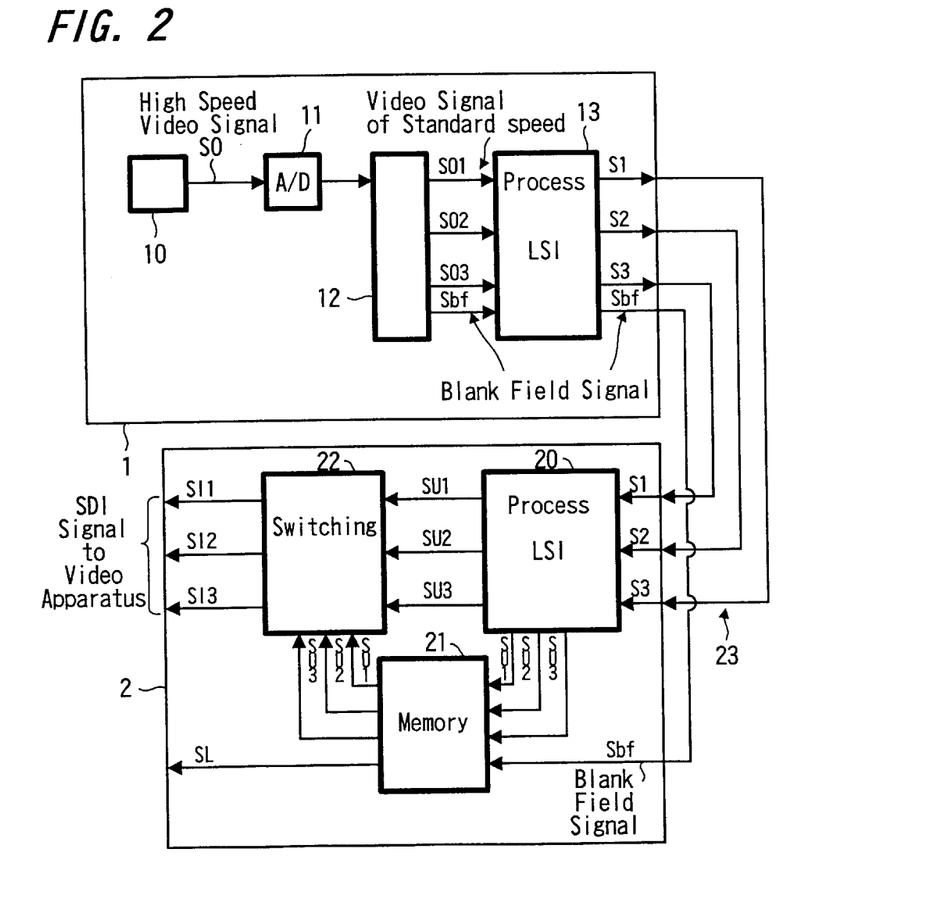
FIG. 2 is a block diagram showing an arrangement of a high-speed photographing video camera system of the embodiment.

A high-speed photographing video camera system constituting a video signal transmitting apparatus-of the embodiment is shown in FIG. 2. The video signal transmitting apparatus of the embodiment will be explained by exemplifying a threefold speed photographing as an example in the high-speed photographing video camera system (hereafter, to be called "a super motion camera system").

With the super motion camera system of the embodiment, in the video camera 1 as shown in FIG. 2, a video signal So, which is obtained at a high-speed photographing threefold as fast as a standard speed by an image pickup device 10 and is an analog video signal, is converted to a digital video signal by an A/D converting circuit 11, which is divided into 3 channels of standard-speed video signals S01~S03 by a memory 12 and the 3 channels of standard-speed video signals S01~S03 are converted into standard video signals S1~S3 of a predetermined transmission format by a process LSI 13 and transmitted to a camera control unit 2 through a wide band transmission path 23.

Here, at a time of a less than threefold high-speed photographing video SO being divided into a plurality of channels of standard video signals S01~S03, a blank field which will be described after is made to be included. A blank field signal Sbf indicates in which field of the plural channels of standard video signals S01~S03 the blank field which will be described after is included. The blank field signal Sbf is similarly transmitted to the camera control unit 2 through the transmission path 23 as well as the standard video signals S1~S3.

In the camera control unit 2, the 3 channels of standard video signals S1~S3 transmitted through the transmission path 23 are converted into 3 channels of standard video signals SU1~SU3 by a process LSI 20 which are capable of being internally processed and the 3 channels of standard-video signals are arranged and outputted to various kinds of video equipments at every unit period as plural channels of SDI output SI1~SI3 by a change-over circuit 22.

Here, a memory 21 judges the blank field from the blank field signal Sbf and accumulates only effective images from 3 channels of standard video signals SU1~SU3 and the memory 21 outputs a slow reproduction signal SL therefrom.

Meanwhile, in the video camera 1, after high-speed video SO of the threefold speed is made 3 channels of standard video signals S01~S03 by using the memory 21, the 3 channels of standard video signals S01~S03 are inputted in the process LSI 13. Here, the process LSI 13 has a function to process a video signal peculiar to a camera contour correction process, gamma correction process, white clip process or the like and a transmitting process function to convert it into a transmission format. Meanwhile, in FIG. 2, the process LSI 13 is shown as a single unit, but the video signal process and the transmitting process may be constituted by separate ICs and also, the video signal processing may be carried out by comprising 3 channels of ICs for the 3 channels of standard video signals S01~S03, in which case a circuit can be constituted by using an IC for the conventional standard camera process as it its.

In the transmitting format converting process IC of process LSI13, the 3 channels of standard camera internal processing digital video signal is converted into a format equivalent to a D1 format which is comprised of a parallel signal of a standard brightness signal 4:2:2, color difference signals Y, CB, CR, a transmitting frequency 27 MHz, 10 bits in bit number. Then, thereafter, in order to transmit a main signal line, a power source and a control signal through the transmission path 23 such as the optical fiber, TRAIX and the like, the 3 channels of video signals are subjected to a time division multiplexing process. Or, other than this, it is possible to transmit them as equivalents of serial SDI signals of 3 channels of 270 MHz by using 3 lines of BNC cables.

Also, since this is the exclusive transmission between the video camera 1 and the CCU 2, an audio signal such as an intercom and the like used for a camera command and a camera system is superimposed thereon. A method of the superimposition employs the same method as the SDI standard based on an SMPTE259M, but since data to be added do not belong in the SDI standard, it is impossible to supply these signals as they are to other apparatuses of the SDI standard. However, since the video signal format is the same, it is possible to use the conventional transmitting apparatus of the SDI standard.

Also, the LSI 20 on the CCU 2 side receives 3 channels of the multiplexed video signals S1~S3 and convert them into 3 channels of CCU internally processing signals SU1~SU3. Thereafter, the CCU 2 outputs them to equipment at a later stage as signals SI1~SI3 of the SDI standard based on the SMPTE259M. In the CCU 2, since signal-processing is carried out as 3 channels of standard signals, it is possible to use an IC of the standard video system as it is in a signal-process such as color corrections, an SDI format conversion and the like.

Figure 3A:
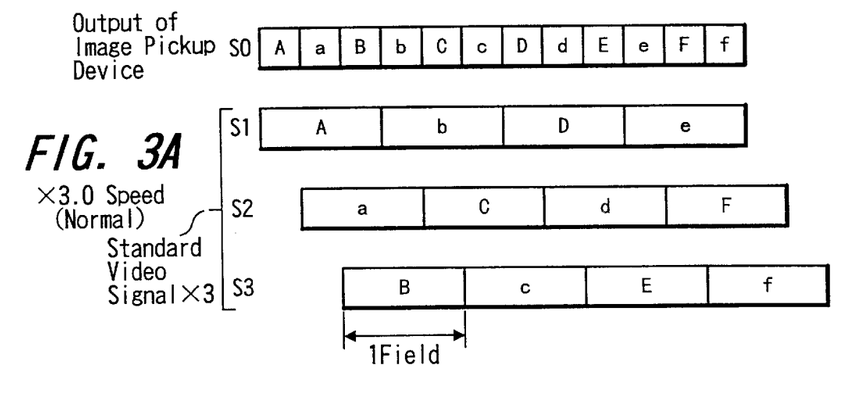
FIG. 3A is a diagram showing an arrangement of a transmitting signal of a camera output at a time of a threefold-speed photographing of the embodiment.
Figure 3B:
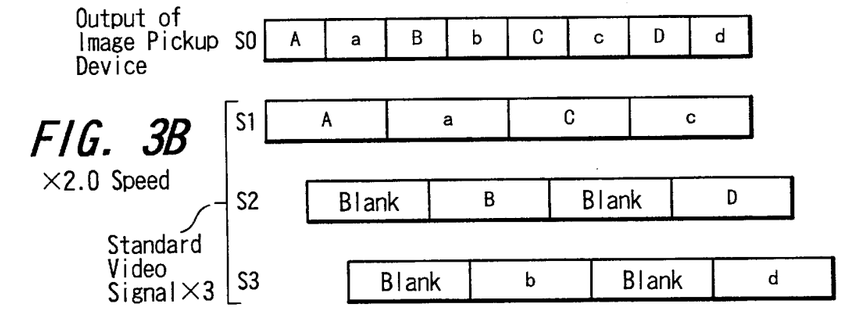
FIG. 3B is a diagram showing an arrangement of a transmitting signal of a camera output at a time of twofold-speed photographing.

FIG. 3 is a diagram showing transmitting signals of camera output at a time of variable speed photographings of the embodiment.

As mentioned above, according to the embodiment, as shown in FIG. 3A, the image pickup device output SO by the threefold high-speed photographing is fundamentally dealt with as 3 channels of digital video signals S1~S3, but in a case of a lesser speed than that, for example, a twofold speed, too, an image pickup device output SO by a twofold high-speed photographing, as shown in FIG. 3B, is transmitted as it is by the 3 channels of the digital video signals. At this time, the high-speed photographing video SO becomes a state of being insufficient for the 3 channels of digital video signals S1~S3. The insufficient part is made a blank in terms of a field unit of the standard video signal, and as shown in FIG. 3B, the 3 digital video signals S1~S3 are transmitted from the camera 1 to 16 the CCU 2 in a state of including the blank field.

Transmission of information on a position of the blank field is carried out by a blank field signal Sbf of one bit different from a video signal from the video camera 1 through the transmission path 23 and the blank field is judged from the blank field signal Sbf by the memory 21 at the CCU 2 to accumulate only effective;images in the memory 21 and by reading the video from the memory 21, a slow reproducing video signal SL is outputted from the high-speed photographing video SO.

Ordinarily, this serialized video signal within the memory 21 is read at a standard speed to be a slow reproducing video signal SL. The slow reproducing video signal SL is recorded as a super motion image by an outside apparatus.

Figure 4A:
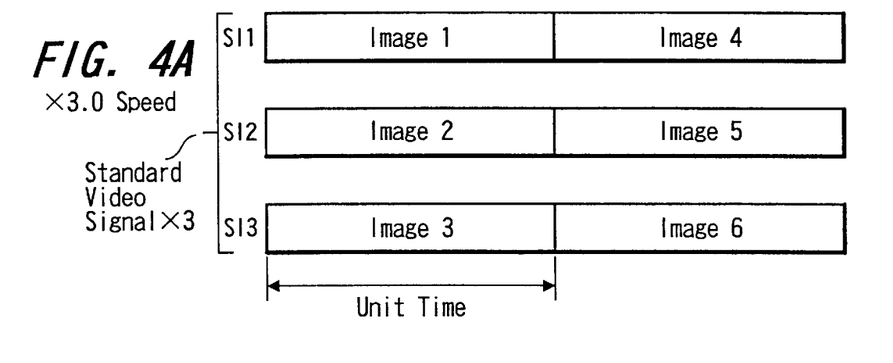
FIG. 4 is a diagram showing an arrangement of a transmitting signal of an CCU output at a time of a threefold-speed photographing of the embodiment.
Figure 4B:
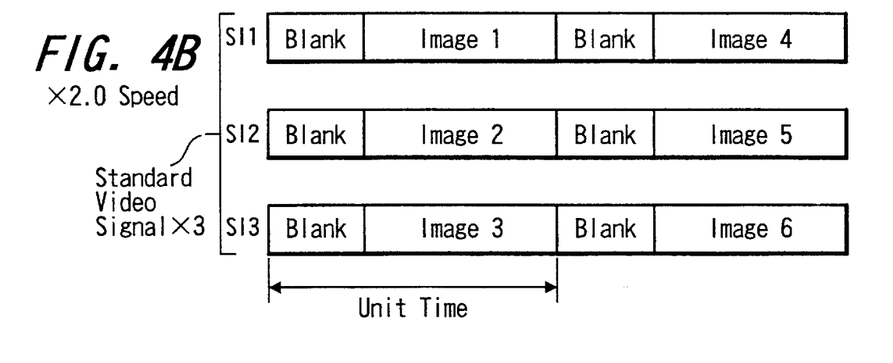
FIG. 4B is a diagram showing an arrangement of a transmitting signal of an CCU output at a time of twofold-speed photographing.

FIG. 4 is a diagram showing a transmitting signal outputted by the CCU 2 at a time of a variable speed photographing of the embodiment. FIG. 4A shows the case of threefold speed and FIG. 4B shows the case of less than threefold speed (in this example twofold speed).

Here, at a time of a less than threefold speed photographing being carried out by the video camera 1, when 3 channels of the less than threefold video signals are outputted to 3 channels of video outputting lines leading to the outside apparatus of the CCU 2, the blank field is getting mixed with the video signals in a thin state and as a result, they become signals difficult to be dealt with by the outside apparatus at a later stage.

Therefore, as shown in FIG. 4B, by intermittently outputting, at every unit time period T including a blank time, the video which is once accumulated in the memory 21 and rearranged, a smooth image is intended.

The unit time period T as shown in FIG. 4 is decided by a storage capacity of the memory 21 in the CCU 2 and for operational convenience of writing and reading of video data to and from the memory 21. Meanwhile, a blank period in FIG. 4 is different from the blank field in FIG. 3 which is provided at a field unit of standard video signal.

In this case, an output of the 3 channels of standard video signals SI1~SI3 in real time at the time of the threefold speed photographing shown in FIG. 4A becomes unable to be hoped for, but since reading of video data from the memory 21 becomes faster than writing it thereto, it is possible to avoid such a fear that the photographed image overflows the memory 21 in the CCU 2, and the overflowing video image is escaped.

Meanwhile, by putting in place a video in which are written, for example, scene information, photographing speed information, reproduction recycle information and the like in the forms of character video during the blank period of the less than threefold speed video signal, editing at a later stage becomes easy and it becomes possible to effectively use the 3 channels of SDI signals at a variable speed photographing and further, in addition to this, by outputting a control signal indicating the blank period to the video equipment at a later stage, recording and the like of the video signal can be carried out as when the threefold speed photographing is ordinarily carried out.

In a case where a digital transmission super motion camera system is constituted according to the embodiment, it is unnecessary to carry out a high-speed A/D conversion and develop an exclusive high-speed processing LSI for processing its signal. Since it becomes possible to realize the system by preparing 3 sets of LSIs for a standard-speed video signal, a simple designing becomes possible.

Also, since an outside video system becomes capable of processing a super motion video signal by only treating the 3 channels of standard SDI signals equivalently and the signal is a standard-speed signal for video apparatus, it is possible to use existing 3-input video apparatus and the like as they are.

Also, at a time of a speed photographing other than the threefold speed one, since there is a limit to a storage capacity of the memory 21 which the CCU 2 of the embodiments has within, there is a fear that all of video sources will be unable to be recorded by a video apparatus recording only a slow reproduction output, but, even in that case, it is useful to be able to record 3 channels of SDI output lines and failing to catch the video source can be avoided.

Next, another video camera of the embodiment will be explained.

The video camera 1 used in a super motion camera system as described above has only a high-speed photographing function, but another video camera as will be described hereinafter has both a standard speed and a high-speed photographing functions.

Another video camera of the embodiment, by making signal processing systems between a special photographing and a standard photographing the same in a special camera which outputs a video signal of a high speed photographing and a video signal of a standard system such as NTSC/PAL and the like, intends to generate an image without a sense of disorder between signals of different systems.

With the video camera having a special function such as a high-speed photographing and a function of outputting ordinary video signals such as the NTSC/PAL and the like, power consumption increases because the scale of signal processing circuit becomes large due to multifunction and it causes the increase of power consumption. With the increase of power consumption, there occurs a temperature rising in the set, which gives a bad influence on the reliability of the set and so, the lowering of the power consumption is required.

The video camera as will be described hereinafter is applied to process video signals of standard speed and high-speed and to decrease the power consumption.

Figure 5:
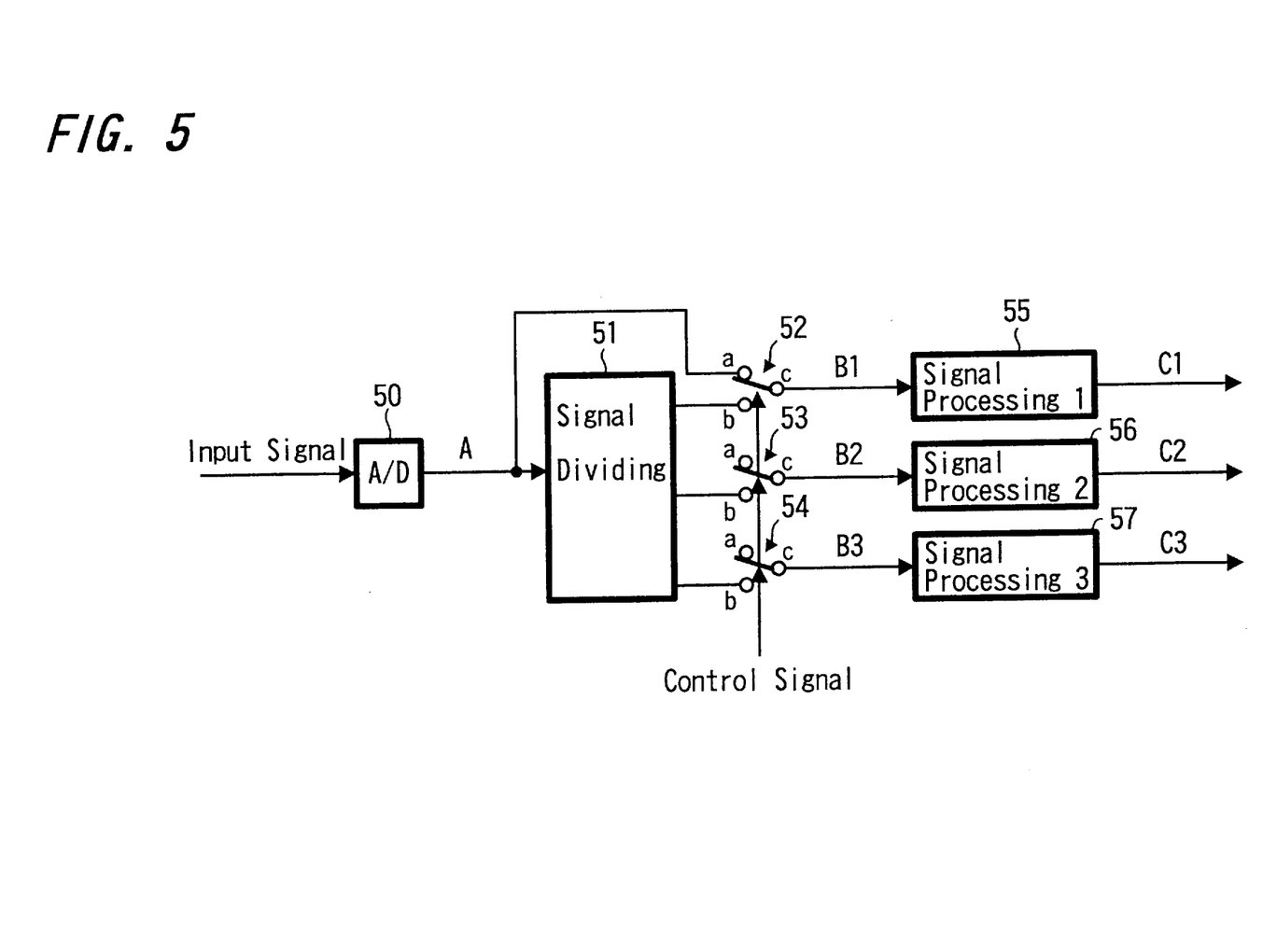
FIG. 5 is a block diagram showing an arrangement of another video camera of the embodiment.

FIG. 5 is a block diagram showing an arrangement of another video camera of the embodiment. Hereinafter, the description of the image pickup means for standard speed and high-speed photographing is omitted. In FIG. 5, an analog video signal is inputted as a signal input, and the video signal is subjected to an A/D conversion by an A/D converting circuit 50 to be supplied to a signal dividing circuit 51 as a digital video signal A. Here, since the signal A is outputted at a higher frequency than a digital signal frequency used for signal-processing in signal processing circuits (1) 55~(3) 57 at a later stage, a signal frequency is converted by the signal dividing circuit 51 to match a signal processing frequency at the later stage. The signal dividing circuit 51 corresponds to the memory 12 of the video camera 1 as described above. Therefore, the video signal A is converted to a ⅓ frequency by the signal dividing circuit 51 to be converted into standard signals B1~B3. The signals B1~B3 are supplied to signal processing circuits (1) 55~(3) 57 through switches 52~54 to be subjected to the same signal processing in each signal processing circuit and outputted as signals C1~C3. In this case, the switches 52~54 have each movable contact point c connected to each fixed contact point b side. The signal processing circuits (1)55~(3)57 correspond to the process LSI 13 of the video camera 1 described above.

Meanwhile, according to the embodiment, a frequency of an input signal varies from one to threefold and when the signal input is onefold, since a signal frequency of signal A and a signal frequency of signal B are the same, the signal A is directly supplied to only the signal processing circuit (1) 55, not through the signal dividing circuit 51. By doing in this fashion, since circuit operations of the signal dividing circuit 51 and the signal processing circuits (2) 56~(3) 57 can be stopped, power consumption can be reduced. In this case, contrary to what mentioned above, the switches 52~54 have each movable contact point c connected to a fixed contact point a side.

Also, by coping that selection of the threefold speed signal and the onefold speed signal can be carried out by control signal, when the control signal does not select signal division, the signal B1 is inputted to the signal processing circuit and the signals B2, B3 become non-signal. In this manner, reduction of power consumption is carried out by stopping the operation of the signal processing circuit and at the same time, since the signal processing circuits have the same characteristics, it is possible to protect image quality from deteriorating due upon a change-over.

Figure 6:
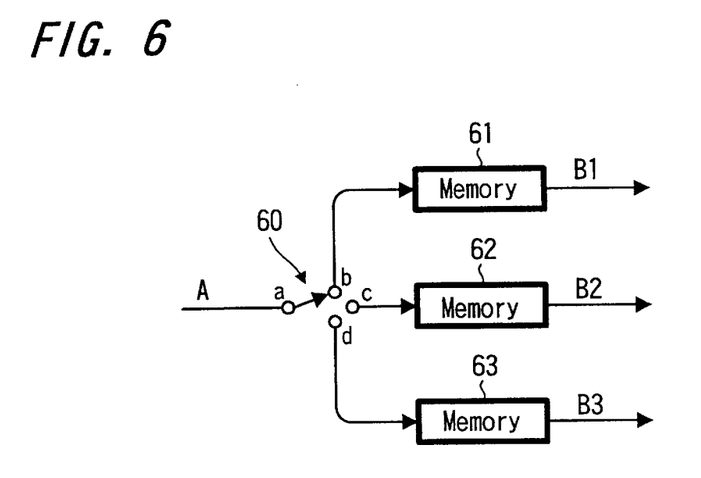
FIG. 6 is a block diagram showing a signal dividing circuit of the embodiment.

FIG. 6 is a block diagram showing an arrangement of the signal dividing circuit of the embodiment. As mentioned above, the signal dividing circuit 51 is a circuit for carrying out a frequency conversion because the signal frequencies of the signal A and the signal B are different. In a video camera, there are signals such as R (red), G (green), B (blue) or the like of 3 primary color signals and the like and practically, processings of the three signals are necessary, but in the following explanation, one system will be explained.

In FIG. 6, by connecting a movable contact point a to a fixed contact point b side, or c side, or d side, a signal A is supplied to each of memory circuits 61~63 through the switch 60 one channel each. The signal A is supplied to respective memories 61~63 by being changed-over by a vertical synchronizing signal V. Since the signals inputted to the memories 61~63 are supplied to the next stage signal processing circuits (1) 55~(3) 57, they are read out as signals B1~B3 of respective frequencies for the signal processing circuits (1) 55 to (3) 57. When there is a threefold difference in frequencies between the signal A inputted to the signal dividing circuit 51 and the signals B1~B3 outputted therefrom, the signals B1~B3 which are converted to ⅓ signals by using the memories circuits 61~63 of 3 channels, as shown in FIG. 6, are supplied to the next stage signal processing circuits (1) 55~(3) 57. In order to control the signal A which is supplied to each memory 61~63, address control of each memory 61~63 or chip select (CS) control can be used instead of the switch 60.

Figure 7:
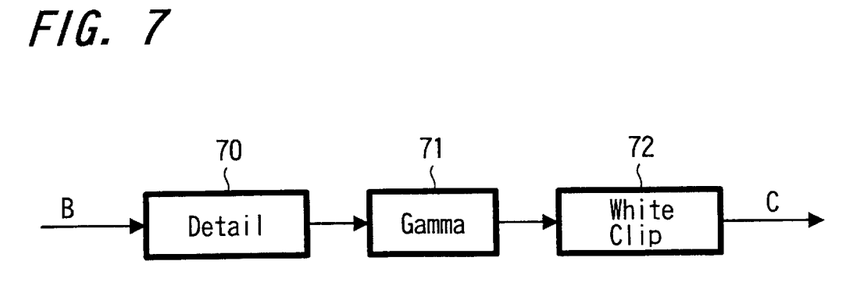
FIG. 7 is a block diagram showing an arrangement of signal processing circuits 1~3 of the embodiment.

FIG. 7 is a block diagram showing an arrangement of the signal processing circuits (1)~(3) of the embodiment. The signal processing circuits (1) 55~(3) 57 are circuits of the same characteristic, and the 3 channels operate to perform the same signal processing, too. Each signal processing circuit, as shown in FIG. 7, carries out an outline correcting process to a signal B by a detail processing circuit 70, subjects output video signals R, G, B of an image pickup device to gamma correction for proportioning a strength of an incidence light on the image pickup device to a luminous strength of a display by a gamma processing circuit 71, generates from the gamma-corrected signal a luminance signal and a color difference signal, and subjects the same to a white clip process for compression of a dynamic range by a white clip processing circuit 72 to thereby output a signal C.

Figure 8:
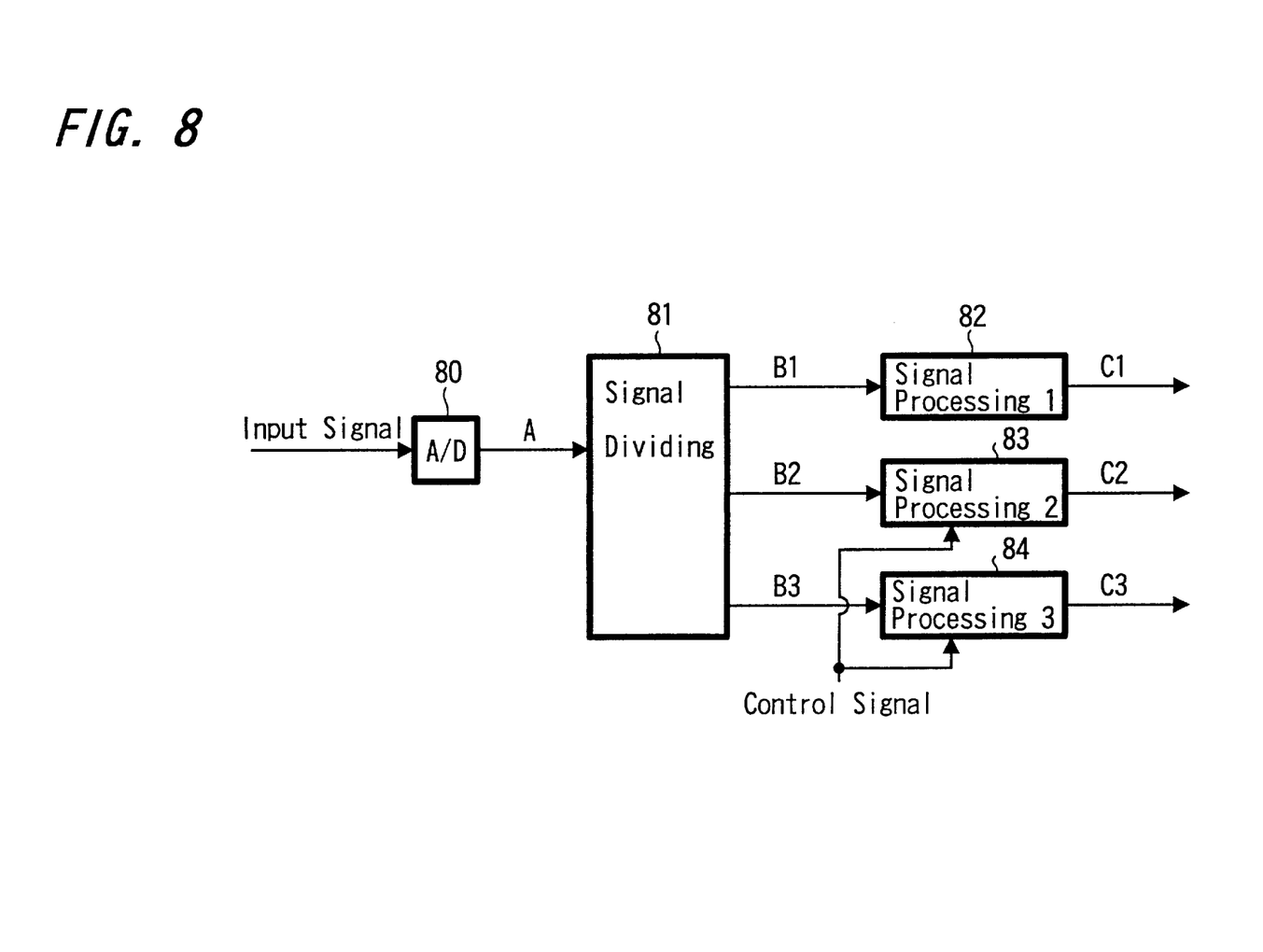
FIG. 8 is a block diagram showing an arrangement of another video camera of the embodiment.

FIG. 8 is a block diagram showing an arrangement of another video camera system of the embodiment. As shown in FIG. 8, as a method of changing over the signal B, there may be an arrangement in which by change-over operations of signal processing circuits (2) 83, (3) 84 ON or OFF by the control signal, it is selectively changed over whether the signal processing circuits (1) 82~(3) 84 are used by 3 channels or 1 channel.

Meanwhile, an A/D converting circuit 80, a signal dividing circuit 81, and the signal processing circuits (1) 82~(3) 84 correspond to the A/D converting circuits 50, the signal dividing circuit 51, and the signal processing circuits (1) 55~(3) 57 shown in FIG. 5 respectively.

Figure 9:
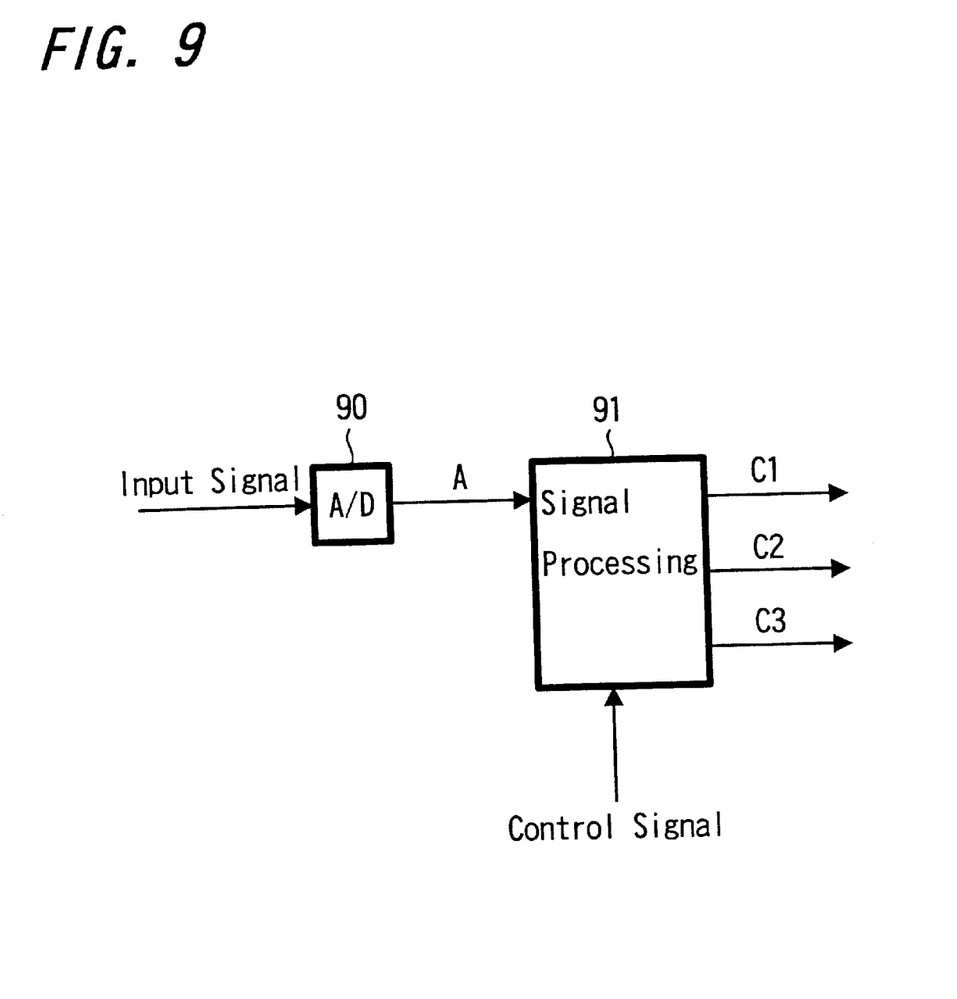
FIG. 9 is a block diagram showing an arrangement of another video camera of the embodiment.

FIG. 9 is a block diagram showing an arrangement of another video camera system of the embodiment. As shown in FIG. 9, there may be an arrangement in which as a signal processing circuit 91 there is used a circuit capable of threefold signal-processing in response to a control signal to output signals C1~C3 from a signal A. Also, selection may be made about whether to carry out a signal process by a threefold clock or to carry out a signal process by onefold clock in response to the control signal in the signal processing circuit 91.

Meanwhile, an A/D converting circuit 90 and the signal processing circuit 91 correspond to the A/D converting circuit 50 and the signal processing circuits (1) 55~(3) 57 shown in FIG. 5, respectively.

By doing in this manner, reduction of power consumption by the signal processing circuits can be implemented.

Meanwhile, in another video camera of the above-mentioned embodiments, the arrangements of FIG. 5~FIG. 9 may be provided on the video camera side or the CCU side.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A signal transmitting apparatus for transmitting high-speed video signals, said video signals being obtained by picking up an image of an object by an image pickup means at a speed which is predetermined times faster than that of a first video signal, comprising;

a converting means for converting the output of said image pickup means into digital signals, a signal dividing means for forming digital video signals having the speed of said first video signal from the high-speed video signals outputted from paid converting means at every unit, dividing said digital video signals into a plurality of channels and outputting said digital video signals, a first signal processing means for performing a predetermined camera signal process to each of the output signals of said signal dividing means, converting said output of said signal dividing means into digital signals of said plurality of channels in the predetermined transmission format and outputting said digital signals, wherein said signal dividing means generating an indication signal when high-speed video digital signals having a multiple number smaller than the number of channels of said signal dividing means are inputted from said converting means, the indication signal indicating the period in which no digital video signal having the speed of said first video signal exists on divided channel, and outputting said indication signal to said first signal processing means, said first signal processing means outputting the digital signals of a predetermined transmission format, the period in which no digital video signal having the speed of said first video signal exists, and said indication signal, a transmission path for transmitting the output of said first signal processing means, a second signal processing means for converting said digital signals of said predetermined transmission format which have been transmitted through said transmission path into said digital video signals having a plurality of channels, an output means for converting the output of said second signal processing means into digital signals in the predetermined format and for outputting said digital signals, and a memory means for writing each of said digital video signals of said plurality of channels outputted from said second signal processing means, and reading said digital video signals of said plurality of channels outputted from said transmission path and arranged at every unit time with additional data period which is added in responsive to said indication signal and outputting said digital signals of said plurality of channels with each additional data period which have been read by said memory means to said output means, wherein said output means selects and outputs said digital video signals of said plurality of channels with additional data period which have been read by said memory means.

2. The signal transmitting apparatus as claimed in claim 1, said memory means being applied to storage additional data including accompanying information, to read said additional data during said additional data period and to output said additional data with digital video signals of said plurality of channels.

3. The signal transmitting apparatus as claimed in claim 2, said memory means being applied to read said digital video signals of said plurality of channels at every unit of time sequentially, which have been already written, and to output said digital video signals as slow motion digital video signals.

4. A signal transmitting apparatus for transmitting high-speed video signals, said video signals being obtained by picking up an image of an object by an image pickup means at a speed which is predetermined times faster than that of a first video signal, the signal transmitting apparatus comprising:

a converting means for converting the output of said image pickup means into digital signals;

a signal dividing means for forming digital video signals having the speed of said first video signal from the high-speed video signals outputted from paid converting means at every unit, dividing said digital video signals into a plurality of channels and outputting said digital video signals;

a first signal processing means for performing a predetermined camera signal process to each of the output signals of said signal dividing means, converting said output of said signal dividing means into digital signals of said plurality of channels in the predetermined transmission format and outputting said digital signals;

a transmission path for transmitting the output of said first signal processing means;

a second signal processing means for converting said digital signals of said predetermined transmission format which have been transmitted through said transmission path into said digital video signals having a plurality of channels;

an output means for converting the output of said second signal processing means into digital signals in the predetermined format and for outputting said digital signals; and a memory means applied to read said digital video signals of said plurality of channels at every unit of time sequentially, which have been already written, and to output said digital video signals as slow motion digital video signals.

5. A signal transmitting method for transmitting high-speed video signals which are obtained by photographing an object by an image pickup means at a speed which is predetermined times faster than that of standard video signal comprising:

a converting step of converting the output of said image pickup means into digital signals, a signal dividing step of forming the digital signals having the speed of said standard video signal from said high speed photographing video signals unit by unit which have been formed in said converting step, dividing said digital video signals into a plurality of channels and outputting said divided digital video signals, said signal dividing step generating an indication signal when high-speed video digital signals having a multiple number smaller than that of said channels in said signal dividing step are inputted from said converting step, said signal dividing step indicating the period in which no digital video signal having the speed of said standard video signal exists on divided channel, and outputting said indication signal to said first signal processing step, a first signal processing step of performing a predetermined camera signal process to each of the output signals of said signal dividing step, converting said digital signals into digital signals of said plurality of channels in a predetermined transmission format and outputting said signals, said first signal processing step outputting said digital signals in a predetermined transmission format, no digital video signal said no digital video signal having said standard video signal exists, and said indication signal, a transmitting step of transmitting the output of said first signal processing step, a second signal processing step of converting the digital signals which have been converted into a predetermined format and have been transmitted by said transmitting step into the original digital video signals of said plurality of channels, an output step of converting the output of said second signal processing step into digital signals in a predetermined format and outputting said digital video signals; and said memory step writing each of said digital video signals of said plurality of channels outputted from said second signal processing step, reading said digital video signals of said plurality of channels outputted from said transmitting step and arranged at every unit time with additional data period which is added in responsive to said indication signal and outputting said digital video signals of said plurality of channels with each additional data period which have read by said memory step to said output step, wherein said output step selecting and outputting said digital signals of said plurality of channels with additional data period which have been read by said memory step.

6. A high speed image pickup apparatus which is applied to pick up an image of an object at a high speed which is faster than that of standard video signal and to output high-speed video signals obtained thereby comprising:

an image pickup means for picking up an image of an object at a speed which is predetermined times faster than that of the standard video signal, a converting means for converting the output of said image pickup means into digital signals, a signal dividing means for forming digital video signals having the speed of said standard video signal from the output of said converting means at every image unit, dividing said digital video signals into a plurality of channels and outputting said divided digital video signals, said signal dividing means generating an indication signal when the multiple number of said photographing speed of said image pickup means is smaller than the number of channels of said signal dividing means, said signal dividing means indicating the period in which no digital video signal having the speed of said standard video signal exists on a divided channel, and outputting said indication signal to said signal processing means, and a signal processing means for performing a predetermined camera signal, process to each of the output signals of said signal dividing means, converting said digital signals into digital signals of said plurality of channels in a predetermined format and outputting said digital signals as high speed photographing video signals, said signal processing means outputting said digital video signals in a predetermined transmission format, no digital video signal said no digital video signal having said standard video signal exists and said indication signal.

7. A high speed image pickup method for picking up an image of an object at a high speed which is faster than that of standard video signal and for outputting the obtained high speed photographing video signals comprising:

an image pickup step for picking up an image of an object at a speed which is predetermined times faster than the speed of the standard video signal and for forming the video signals, a converting step of converting the output of said image pickup step into digital video signals, a signal dividing step of forming the digital video signals having the speed of standard video signal from the output of said converting step at every video unit, dividing said digital video signals into a plurality of channels and outputting said divided digital signals, said signal dividing step generating an indication signal when the multiple number of said image pickup speed of said image pickup step is smaller than the number of said channels in said signal dividing step, said signal dividing step indicating the period in which no digital video signal having the speed of said standard video signal exists on divided channel, and outputting said indication signal to said signal processing step, and a signal processing step of performing a predetermined camera signal process to each of the output signals of said signal dividing step, converting said digital signals of said plurality of channels into a predetermined transmission format and outputting said digital video signals as high speed photographing video signals, said signal processing step outputting digital signals in said predetermined transmission format, no digital video signal said no digital video signal having the speed of said standard video signal exists, and said indication signal.

8. An image pickup apparatus for picking up an image of an object at a speed which is selected from the speed of standard video signal and speeds faster than that of the standard video signal and for outputting the standard video signals or high speed photographing video signals which have been obtained thereby comprising:

an image pickup means for picking up an image of said object at a speed which is selected from the speed of the standard video signal or the speeds a predetermined times faster than that of the standard video signal, a converting means for converting the output of said image pickup means into digital signals, a signal dividing means for outputting the output of said converting means when the speed at which said image pickup means picks up an image of said object is the same as that of standard video signal and for forming digital video signals having the speed of said standard video signal from the output of said converting means at every video unit, dividing said digital video signals into a plurality of channels and outputting said digital video signals when the speed at which said image pickup means picks up an image of said object is predetermined times faster than that of the standard video signal, a plurality of signal processing circuits, the number of which is at least the same as that of said channels divided by said signal dividing means and each having the same predetermined camera signal process function, when the speed at which said image pickup means picks up an image of said object is the same as that of standard video signal, the output of said signal dividing means being processed by one channel of said signal processing circuits to convert said digital video signals into digital signals in the predetermined format, the operation of the other channels being stopped, when the speed at which said image pickup means picks up an image of said object is predetermined times faster than that of standard video signal, the output of said signal dividing means being processed by all the channels of said signal processing circuits to convert said digital signals into digital signals of said plurality of channels in a predetermined format to be outputted as high speed photographing video signals.

9. A signal transmitting apparatus for transmitting a first digital video signal, comprising:

a signal dividing means having a memory, said signal dividing means forming a second plurality of digital video signals having a speed lower than that of said first digital video signal, such that said signal dividing means divides said first digital video signal into a plurality of channels, each channel configured to carry one of said second plurality of digital video signals; and an output means for outputting said second plurality of digital video signal on said plurality of channels, wherein when said first digital video signal has a length less than the number of said plurality of channels, said signal dividing means writes said first digital video signal into said memory, and reads said first digital video signal from said memory so as to output said first digital video signal as one of said second plurality of digital video signals on said plurality of channels, said second plurality of digital video signals arranged at every unit time with additional data period which is added in response to an indication signal that indicates the period in which no digital video signal having the speed of said first digital video signal exists on divided channel and outputs said second plurality of video signals on said plurality of channels with each additional data period.

10. The signal transmitting apparatus according to claim 9, wherein said signal dividing means outputs said indication signal.

11. A signal processing apparatus, comprising:

a signal dividing means for outputting an input digital video signal when the speed of the input digital video signal is the same as that of an output digital video signal, the signal dividing means operating to divide the input digital video signal into a plurality of channels to form digital video signals having the speed of said output digital video signal; and a plurality of signal processing circuits, the number of said plurality of signal processing circuits is at least the same as that of said plurality of channels, each of said plurality of signal processing circuits has the same predetermined signal process function, wherein when the speed of the input digital video signal is the same as that of the output digital video signal, the output of said signal dividing means is processed by one channel of said signal processing circuits, and operation of the other channels is discontinued, wherein when the speed of the input digital video signal is faster than that of the output digital video signal, the output of said signal dividing means is processed by all channels of said digital processing circuits.

12. A video signal processing apparatus, comprising:

a signal processing means configured to receive second digital video signals from a plurality of channels for processing the second digital video signals, wherein said second digital video signals are transmitted from a signal transmission apparatus for processing said second digital video signals of said plurality of channels, and wherein said signal transmission apparatus includes:

a signal dividing means having a memory for forming second digital video signals from a first digital video signal, said second digital video signals having a speed lower slower than that of the first digital video signal, said signal dividing means configured to divide said first digital video signal into the plurality of channels, each channel corresponding to each of said second digital video signals; and an output means for outputting said plurality of said second digital video signals as said plurality of channels, wherein, when there are less number of signals in said first digital video signals than said plurality of channels, said signal dividing means writes said first digital video signal in said memory, reads said first digital video signal from said memory, and outputs said second digital video signal of said plurality of channels arranged at every unit time with additional data period that is added in response to an indication signal, the indication signal indicating the period in which no digital video signal has the speed of said first digital video signal on divided channel, said signal dividing means outputting said plurality of second digital video signals of said plurality of channels with each additional data period; and a change-over control means configured to receive outputs of said signal processing means for arranging the outputs of said signal processing means at every unit period and outputting the arranged signals.

* * * * *